United States Patent Office 3,562,302
Patented Feb. 9, 1971

3,562,302
PREPARATION OF FATTY ACID AMIDES FROM NITRO-NITROSOALKANES AND NITROALKANONE OXIMES
Alan F. Ellis, Murrysville, Pa., assignor to Gulf Research & Development Company, Pittsburgh, Pa., a corporation of Delaware
No Drawing. Filed Dec. 9, 1968, Ser. No. 782,430
Int. Cl. C09f 7/00, 7/08
U.S. Cl. 260—404                                              10 Claims

ABSTRACT OF THE DISCLOSURE

Fatty acid amides, such as valeramide, are prepared by the reaction of a 1-nitro-2-nitrosoalkane or a 1-nitroalkanone-2 oxime with an anhydrous mineral acid, such as sulfuric or phosphoric acid, at intermediate temperatures of, for example, about 70° C. for relatively short contact times. The lower fatty acids, such as acetic acid, are useful as solvent mediums.

---

This invention relates to the preparation of fatty acid amides from certain nitro-nitrosoalkanes and nitroalkanone oximes.

In accordance with the invention, a fatty acid amide having from 2 to 24 carbon atoms can be prepared by reacting at least one 1-nitroalkane having from 3 to 25 carbon atoms selected from the group consisting of a 1-nitro-2-nitrosoalkane having a hydrogen atom on the beta carbon atom and a 1-nitroalkanone-2 oxime with a mineral acid selected from the group consisting of sulfuric and phosphoric acids in a substantially anhydrous reaction medium comprising said mineral acid, under reaction conditions including a temperature of from 60° C. to 160° C.

The charge stock can be any 1-nitroalkane selected from the group consisting of a 1-nitro-2-nitrosoalkane having a hydrogen atom on the beta carbon atom or a 1-nitroalkanone-2 oxime. The 1-nitroalkane suitably has from 3 to 25 carbon atoms and preferably has from 4 to 18 carbon atoms.

The monomeric 1-nitro-2-nitrosoalkanes have the formula:

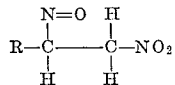

where R is a saturated alkyl radical having from one to 23 carbon atoms.

The preferred 1-nitroalkanone-2 oxime compounds can be represented by the general formula:

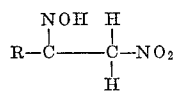

where R is a saturated alkyl radical having from one to 23 carbon atoms.

Thus, the 1-nitroalkanone-2 oxime compounds are really isomers of the 1-nitro-2-nitrosoalkanes defined above.

The 1-nitro-2-nitrosoalkanes defined above dimerize through the nitrogen atom of the nitroso group and the dimers have the formula:

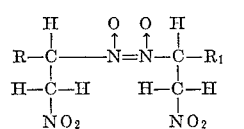

where R is as defined above. By a "1-nitro-2-nitrosoalkane" in this application is meant either the monomeric 1-nitro-2-nitrosoalkane defined above or the dimeric nitro-nitrosoalkanes defined above.

These dimeric nitro-nitrosoalkanes are called bis(1-nitro-2-nitrosoalkanes) in the art. It is understood by those with ordinary skill in the art that nitrosoalkanes dimerize through the N atom of the nitroso group. Such terminology is used, for example, in United States Pat. No. 3,379,710 to Alan F. Ellis; United States Pat. No. 3,009,-965 to Moeller et al.; and in two articles by John F. Brown, Jr. entitled "The Infrared Spectra of Nitro and Other Oxidized Nitrogen Compounds" and "The Reaction of Nitric Oxide with Isobutylene" published in the Journal of the American Chemical Society, vol. 77, pages 6341–6351, and volume 9, pages 2480–2488, respectively.

The 1-nitro-2-nitrosoalkanes can be prepared by any suitable procedure such as that disclosed in United States Pat. No. 3,379,710 to Alan F. Ellis issued on Apr. 23, 1968.

The 1-nitroalkanone-2 oxime can be prepared by isomerizing the 1-nitro-2-nitrosoalkanes. The isomerization of the 1-nitro-2-nitrosoalkanes preferably occurs in the presence of a solvent catalyst, such as glacial acetic acid, as more fully described in my copending United States Ser. No. 782,447, filed concurrently herewith and assigned to the same assignee as the subject file.

Suitable charge stocks, therefore, include the monomeric forms of the 1-nitroalkane charge stocks, namely, the 1-nitro-2-nitrosoalkanes and the 1-nitroalkanone-2 oximes in addition to the dimeric 1-nitro-2-nitrosoalkanes known in the art as the bis(1-nitro-2-nitrosoalkanes).

It is believed, although it is not certain, that the reaction to form the desired fatty acid amide proceeds through the monomeric form of the 1-nitroalkanes, and thus the monomeric 1-nitro-2-nitrosoalkane and 1-nitroalkanone-2 oxime forms of the charge stock are preferred. Additionally, the dimeric form of the 1-nitro-2-nitrosoalkanes is a solid, while the monomeric and oxime forms tend to be liquid and are thus easier to disperse in the reaction medium. This feature is important since the reaction to form the amide is highly exothermic and results in gas evolution and ease of dispersion of the charge stock in the reaction medium aids in temperature control and overall smoothness of the reaction. However, the 1-nitro-2-nitrosoalkane is usually added in the form of the dimer which is believed to form the monomeric 1-nitro-2-nitrosoalkane before it reacts with the mineral acid.

Examples of suitable 1-nitroalkanes for use as charge stocks in the process of this invention include, but are not limited to:

bis(1-nitro-2-nitroso butane);
bis(1-nitro-2-nitroso hexane);
bis(1-nitro-1-ethyl-2-nitroso pentane);
bis(1-nitro-2-nitroso-3-methyl octane);
bis(1-nitro-2-nitroso decane);
bis(1-nitro-2-nitroso dodecane);
bis(1-nitro-2-nitroso hexadecane);
bis(1-nitro-2-nitroso eicosane);
bis(1-nitro-2-nitroso pentacosane);
1-nitro-2-nitroso butane;
1-nitro-2-nitroso hexane;
1-nitro-1-ethyl-2-nitroso pentane;
1-nitro-2-nitroso-4-methyl octane;
1-nitro-2-nitroso decane;
1-nitro-2-nitroso dodecane;
1-nitro-2-nitroso hexadecane;
1-nitro-2-nitroso eicosane;
1-nitro-2-nitroso pentacosane;
1-nitrobutanone-2 oxime;
1-nitropentanone-2 oxime;
1-nitrohexanone-2 oxime;
1-nitro-4-methyloctanone-2 oxime;
1-nitrododecanone-2 oxime; and
1-nitropentacosanone-2 oxime.

The 1-nitroalkane defined above is converted to a fatty acid amide having one less carbon atom than the monomeric form of the 1-nitroalkane charge stock by reaction with an anhydrous mineral acid selected from the group consisting of sulfuric and phosphoric. Weak acids, such as acetic, do not serve to convert the charge stocks of this invention to fatty acid amides.

By "sulfuric acid" is meant sulfuric acid having an $H_2SO_4$ content of 100 percent and fuming sulfuric acid (oleum) which consists of a solution of $SO_3$ in 100 percent sulfuric acid. The 100 percent sulfuric acid is sometimes referred to as the monohydrate since it comprises one molecule of $SO_3$ combined with one molecule of water. The sulfuric acid which is suitable for use in the process of this invention, therefore, has a molar ratio of $SO_3$ to water from 1:1 to about 1.5:1 or more. The weight percent $SO_3$ in 100 percent $H_2SO_4$ is about 81.5. The weight percent $SO_3$ in the sulfuric acid which is suitable for use in this invention is from 81.5 to about 87 percent, indicating the addition of from 0 to 40 weight percent $SO_3$ to the 100 percent $H_2SO_4$. The preferred sulfuric acid is the commercially available oleum which contains about 20 weight percent added $SO_3$ (a total anhydrous $SO_3$ content of about 84.5 weight percent).

By "phosphoric acid" is meant any polyphosphoric acid well known in the art having an $H_2O/P_2O_5$ ratio of three or less. When the $H_2O/P_2O_5$ ratio is three, the polyphosphoric acid is orthophosphoric acid ($H_3PO_4$). The concentrated phosphoric acids, where the $H_2O/P_2O_5$ is less than three, can be obtained by boiling the orthophosphoric acid or more simply by adding $P_2O_5$ to orthophosphoric acid. Pyrophosphoric acid ($H_4P_2O_7$) has an $H_2O/P_2O_5$ ratio of two, and melting of pyrophosphoric acid produces a mixture of polyphosphoric acids having various $H_2O/P_2O_5$ ratios less than 3:1. Pure $H_3PO_4$ contains 72.4 percent $P_2O_5$, and the orthophosphoric acid is oily in appearance and is viscous. As the weight percent of $P_2O_5$ is increased, the polyphosphoric acids become more viscous, and in the range of 82-89 percent $P_2O_5$ are so viscous as to resemble tar and taffy. When the weight percent $P_2O_5$ is above 90, the polyphosphoric acid is a brittle glass. In order to maintain a workable reaction medium, therefore, the phosphoric acid should have from 72.4 to about 86 percent $P_2O_5$. Phosphoric acid containing higher amounts of $P_2O_5$ can be used only with considerable amounts of solvent. In fact, it is preferred to utilize an inert solvent in all cases with phosphoric acid in order to reduce the viscosity of the reaction medium and for other reasons given below.

The inert solvent can be any material which does not enter into a reaction with either the 1-nitroalkane charge stock or products and which does not enter into reaction with the mineral acid. The preferred inert solvents are the lower alkyl fatty acids having from one to three carbon atoms, such as formic, acetic and propionic acids.

The purpose of the solvent is to allow for greater temperature control in the reaction medium when forming the fatty acid amide (which is a highly exothermic reaction) and to increase the solubility of the organic charge stock and products in the reaction medium. In addition, as noted above, phosphoric acid is a viscous material and the use of a solvent reduces the viscosity of the polyphosphoric acid to a more workable range.

When a solvent is employed, the concentration of the strong mineral acid, calculated as the 100 percent mineral acid, in the reaction medium can suitably be as low as five weight percent and is preferably between 25 and 95 weight percent, more preferably between 50 and 80 weight percent of the 1-nitroalkane free reaction medium.

The reaction medium comprising the strong mineral acid and, in addition, preferably a lower alkyl fatty acid solvent should be substantially anhydrous in order to obtain high selectivity to the formation of the desired fatty acid amides for the presence of water promotes hydrolysis of the amides to fatty acids in the presence of the strong mineral acids.

The reaction of the 1-nitroalkane charge stocks defined above with the strong mineral acids produces the desired fatty acid amides. In addition, gaseous by-products, such as $CO_2$ and nitrogen, are formed and are evolved during reaction. Further, a complex is believed to be formed between the mineral acid and the amide product, this requiring the presence of molar amounts of the strong mineral acid to get substantially complete reaction of the charge stock.

The molar ratio of the strong mineral acid, calculated as the 100 percent mineral acid, to the 1-nitroalkane charge stocks, based on the monomeric form of the charge stock, is suitably from about 1:1 to 50:1 with the preferred molar ratios from about 1.5:1 to 5:1. The range of molar ratios given above based on the dimeric bis(1-nitro-2-nitrosoalkanes) would, of course, be doubled. The 1-nitroalkane charge stocks and the fatty acid amide products are soluble in the strong mineral acid but, as noted above, the use of organic solvents such as the lower alkyl fatty acids serve to increase the ease of solubilizing the charge stocks and products in the reaction medium.

The reaction temperature is not critical, but it is desired to effectuate the conversion of the 1-nitroalkanes to the desired fatty acid amides as quickly as possible and in turn to remove the fatty acid amide from the reaction medium as quickly as possible to avoid any subsequent conversion of the amides in the strong acid to undesired by-products. Suitable reaction temperatures are from 60° to 160° C. and the preferred temperatures are between 80° and 120° C. At temperatures less than about 60° C. the reaction is somewhat slower than is desired, while temperatures above 160° C. promote decomposition of the product.

The reaction pressure is also not critical, but atmospheric pressure operation is preferred for equipment simplification reasons. The pressure should, of course, be sufficient to maintain the reactants in the liquid phase. Thus, if the higher temperature operation is desired, pressurized equipment may be necessary to maintain the solvent in the liquid phase if a solvent is employed. A suitable range of operating pressures is between 0 and 100 p.s.i.g. or more, but atmospheric pressure is preferred.

The reaction of the 1-nitroalkane charge stocks defined above to form the fatty acid amides is very fast under the defined reaction conditions. Under the preferred temperature conditions the reaction is substantially complete within one to five minutes after contacting the 1-nitroalkane with the strong mineral acid. At the higher reaction temperatures the reaction time can be as short as one or two seconds. Even at the lower reaction temperatures of about 60° C. the reaction would be substantially completed in 10 to 30 minutes. It is, of course, highly undesirable to maintain materials in contact with strong mineral acids for extended periods of time, especially at elevated temperatures, for obviously the acids will continue to attack the organic materials to produce unwanted by-products and thus decrease the yield of the desired fatty acid amides. It is therefore preferred to separate the fatty acid amide from the reaction medium as quickly as possible after it is formed. Any suitable means can be used to separate the fatty acid amide, and one suitable means involves the dilution of the reaction product with a sufficient amount of cold water to result in the formation of a separate organic phase. The strong acid catalyst will, of course, pass into the aqueous phase. The organic phase, containing the desired fatty acid amide, can be removed for further separation and purification.

It is further preferred that the reaction product be cooled before it is admixed with the cold water, ice, ice-acetic acid mixtures, etc. in order to slow down further reactions of the fatty acid amide with the strong mineral acid. For example, as noted above, the acid amides are subject to hydrolysis in the presence of aqueous mineral acids to produce organic acids. This further reaction can be minimized by performing the amide separation by water dilution at as low a temperature as possible and in as short a time as possible. It is theerfore preferred to recover the fatty acid acide at a temperature less than about 50° C., and more preferably at a temperature between 0° and 35° C.

As noted above, the reaction of the 1-nitroalkanes to form the desired fatty acid amides is very fast and because of secondary reactions it is important to separate the amide product from the strong mineral acid as quickly as possible. It is also important that the concentration of the 1-nitroalkane charge stock in the strong mineral acid be kept relatively low in order to avoid sudden temperature rises with a consequent promotion of undesired side reactions, such as polymer formation, and in the production of large amounts of gaseous products which tend towards explosive reactions in closed reaction vessels. If means could be provided for controlling the exothermicity of the reaction, then the method of contacting the charge stock and strong mineral acid would not be important. It has been found, however, that admixing a 1-nitro-2-nitrosoalkane with anhydrous sulfuric acid at room temperature in a 1:1 molar ratio and then slowly increasing the reaction temperature results in localized overheating as reaction proceeds with the production of unwanted tarry products and can lead to an undesired runaway reaction rather than to the desired fatty acid amides. It is preferred to add the 1-nitroalkane charge stock to a reaction medium comprising the anhydrous strong mineral acid which is maintained within the desired temperature range. It is further preferred that the reaction medium contain, in addition, the quantity of solvent defined above, and that the charge stock also suitably be dissolved in a sufficient amount of the inert solvent to allow it to be more easily added to the reaction medium.

It is also possible, although not preferred, to preheat the 1-nitroalkane-inert solvent mixture before its addition to the strong mineral acid. If preheating is desired at this point, the temperature of preheat should be kept relatively low, for example, at a temperature of between 50° and 60° C. since the 1-nitroalkane charge stocks tend to thermally decompose to nitroolefins as they are heated to elevated temperatures.

A continuous type of operation is also possible by, for example, the concurrent addition of the 1-nitroalkane and the strong mineral acid at reaction temperatures to a reaction zone such as a coil reactor where the acid and reactants come into contact for the desired amount of time and are then passed into a separation zone where the fatty acid amide products are separated by any suitable means such as those described above.

The invention will be further described with reference to the following experimental work.

In all of the runs, unless otherwise indicated, the 1-nitroalkane charge stock was added to the mineral acid which had been previously heated to the desired reaction temperature. The reaction products were cooled by indirect cooling to 20° C. before being poured over crushed ice. The organic layer was separated and extracted with diethylether. After evaporation of the ether the organic product was analyzed by gas liquid chromatography.

EXAMPLE 1

In the run for this example, 28 millimoles of 1-nitrohexanone-2 oxime was added over a period of 15 to 25 minutes to a reaction pot containing 625 millimoles of phosphoric acid (82–84 percent by weight $P_2O_5$, i.e. commercially available polyphosphoric acid). The phosphoric acid was preheated to a temperature of 120° C. and the reaction pressure was atmospheric. After the addition of the oxime with vigorous stirring, the reaction temperature was maintained for fixe minutes after which time the product was cooled, poured over ice and extracted with ether, and the organic product after the ether was evaporated was analyzed by gas liquid chromatography. Only valeramide was found as a reaction product. No valeric acid or other monomeric products were noted.

EXAMPLE 2

In the run for this example, a mixture of ten grams of bis(1-nitro-2-nitroso decane) and 30 grams of glacial acetic acid was heated to 90° C. for five minutes to convert the bis(1-nitro-2-nitroso decane) into the isomeric 1-nitrodecanone-2 oxime. The resulting solution of the nitroalkanone oxime in acetic acid was added slowly over a 20 minute period to a solution of 50 grams of the same phosphoric acid as used in Example 1 in 50 grams of glacial acetic acid at 125° C. (reflux). The weight percent phosphoric acid, calculated as orthophosphoric acid, in the initial reaction medium was about 31 percent. Heating was continued after the completion of the addition at reflux for an additional ten minutes. The organic product was recovered by the procedure indicated above and was then analyzed by gas liquid chromatography. The organic product was too high boiling for analysis. The organic product was then mixed with ten milliliters of concentrated hydrochloric acid and heated to reflux for two hours to convert any pelargonamide present to pelargonic acid. After separation of the organic product from the aqueous acid the product was again analyzed by gas liquid chromatography. Comparison of the two gas liquid chromatographic analyses indicated only a trace of pelargonic acid in the original product before treatment with the hydrochloric acid, while the hydrolyzed product contained mainly pelargonic acid. While pelargonamide was not observed in the chromatography due to its low volatility, the analysis indicates that the original product was substantially all pelargonamide.

EXAMPLE 3

Example 2 was repeated except 100 grams of acetic acid were used in the initial reaction medium. Thus, the weight percent phosphoric acid, calculated as orthophosphoric acid, in the initial reaction medium was about 20 percent. Substantially the same results were obtained as in Example 2.

A comparison of Examples 1, 2 and 3 shows that phosphoric acid can be used neat or in dilution in a fatty acid (acetic acid) to result in the formation of the desired acid amides.

EXAMPLE 4

Example 1 was repeated except 50 grams of 20 percent oleum was substituted for the phosphoric acid. The analytical results again indicated the original product was substantially all valeramide.

A comparison of Examples 1 and 4 shows that sulfuric and phosphoric acids are substantially equivalent for the subject reaction.

Resort may be had to such variations and modifications as fall within the spirit of the invention and the scope of the appended claims.

I claim:
1. A process for the preparation of a fatty acid amide having from 2 to 24 carbon atoms which comprises reacting at least one 1-nitroalkane having from 3 to 25 carbon atoms selected from the group consisting of a 1-nitro-2-nitrosoalkane having a hydrogen atom on the beta carbon atom and a 1-nitroalkanone-2 oxime with a mineral acid selected from the group consisting of sulfuric and phosphoric acids in an anhydrous reaction medium comprising said mineral acid under reaction conditions including a temperature of from 60° C. to 160° C.

2. A process according to claim 1 wherein the molar ratio of the mineral acid to said 1-nitroalkane is at least about 1:1.

3. A process for the preparation of a fatty acid amide having from 2 to 24 carbon atoms which comprises:

adding a 1-nitroalkane selected from the group consisting of 1-nitroalkanes having the formula:

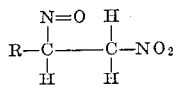

or

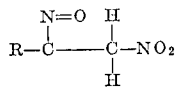

where R is a saturated alkyl radical having from 1 to 23 carbon atoms
to an anhydrous reaction medium comprising a mineral acid selected from the group consisting of sulfuric and phosphoric acids at a rate substantially equal to the rate of reaction of said 1-nitroalkane while the reaction medium is maintained at a temperature from 60° C. to 160° C. for a time between one second and 30 minutes and thereafter recovering said fatty acid amide.

4. A process according to claim 3 wherein said reaction medium also contains a fatty acid solvent having from one to three carbon atoms.

5. A process according to claim 4 wherein the mineral acid is phosphoric acid and the fatty acid solvent is acetic acid.

6. A process according to claim 4 wherein the fatty acid amide is recovered by dilution of the reaction product with a sufficient amount of cold water to result in the formation of an aqueous mineral acid phase and a separate organic phase, separating said organic phase from said aqueous mineral acid phase and recovering the amide from the organic phase.

7. A process according to claim 6 wherein the reaction product is cooled to a temperature less than 50° C. before dilution with water.

8. A process according to claim 3 wherein the mineral acid is sulfuric acid.

9. A process according to claim 4 wherein the amount of solvent is such that the concentration of mineral acid is between 5 and 90 weight percent of the reaction medium.

10. A process according to claim 1 wherein the 1-nitroalkane is a bis(1-nitro-2-nitrosoalkane).

References Cited

UNITED STATES PATENTS

| | | | |
|---|---|---|---|
| 3,369,017 | 2/1968 | Duynstee et al. | 260—561 |
| 2,867,669 | 1/1959 | Burkhard et al. | 260—644 |
| 3,379,710 | 4/1968 | Ellis | 260—143 |

OTHER REFERENCES

Brown, Jr., "The I. R. Spectra of Intro etc."; cited by applicant.

Hornke et al., "Name Reaction in Org. Chem." (1965) CA p. 63 13132 (1965).

Donaruma et al., "The Prep of Amides From Salts, etc."; (1956) J. Org. Chem., 21, pp. 965–67 (1956).

Royals, "The Beckmann Rearrangement," (1956), Adv. Org. Chem. (1956), pp. 608–609.

Chachaty et al., "E.P.R. Spectra of Radicals Formed etc." (1967) CA 67 p. 5581 No. 59390p. (1967).

LEWIS GOTTS, Primary Examiner

G. HOLLRAH, Assistant Examiner

U.S. Cl. X.R.

260—561

UNITED STATES PATENT OFFICE
CERTIFICATE OF CORRECTION

Patent No. 3,562,302  Dated February 9, 1971

Inventor(s) Alan F. Ellis

It is certified that error appears in the above-identified patent and that said Letters Patent are hereby corrected as shown below:

Column 1, lines 52-55, the formula reading $$\begin{array}{cc} \text{NOH} & \text{H} \\ | & | \\ \text{R} - \text{C} - \text{C} - \text{NO}_2 \\ & | \\ & \text{H} \end{array} \quad \text{should read} \quad \begin{array}{cc} \text{NOH} & \text{H} \\ || & | \\ \text{R} - \text{C} - \text{C} - \text{NO}_2 \\ & | \\ & \text{H} \end{array}$$

Column 2, line 12, "volume 9" should read -- volume 79 -
Column 2, line 52, "bis(1-nitro-2-nitroso-3-methyl octan should read -- bis(1-nitro-2-nitroso-4-methyl octane --.
Column 5, line 3, "theerfore" should read -- therefore -
Column 7, lines 8-12, the formula reading $$\begin{array}{cc} \text{N=O} & \text{H} \\ | & | \\ \text{R} - \text{C} - \text{C} - \text{NO}_2 \\ & | \\ & \text{H} \end{array} \quad \text{should read} \quad \begin{array}{cc} \text{N-OH} & \text{H} \\ || & | \\ \text{R} - \text{C} - \text{C} - \text{NO}_2 \\ & | \\ & \text{H} \end{array}$$

Signed and sealed this 13th day of July 1971.

(SEAL)
Attest:

EDWARD M. FLETCHER, JR.
Attesting Officer

WILLIAM E. SCHUYLER,
Commissioner of Paten